(12) United States Patent
Sawai

(10) Patent No.: US 10,904,709 B2
(45) Date of Patent: Jan. 26, 2021

(54) TRANSMISSION/RECEPTION DEVICE, MOBILE TERMINAL, AND COMMUNICATION PROGRAM

(71) Applicant: YOKOWO CO., LTD., Tokyo (JP)

(72) Inventor: Tetsuji Sawai, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 16/651,369

(22) PCT Filed: Aug. 28, 2018

(86) PCT No.: PCT/JP2018/031683
§ 371 (c)(1),
(2) Date: Mar. 27, 2020

(87) PCT Pub. No.: WO2019/069590
PCT Pub. Date: Apr. 11, 2019

(65) Prior Publication Data
US 2020/0296546 A1    Sep. 17, 2020

(30) Foreign Application Priority Data

Oct. 4, 2017 (JP) .................................. 2017-194111

(51) Int. Cl.
*H04W 8/00* (2009.01)
*H04W 4/40* (2018.01)
(Continued)

(52) U.S. Cl.
CPC ............. *H04W 4/029* (2018.02); *H04W 4/40* (2018.02)

(58) Field of Classification Search
CPC ......... H04W 4/40; H04W 4/046; H04W 4/44; H04W 4/46; H04W 4/029; G01S 11/06
See application file for complete search history.

(56) References Cited

U.S. PATENT DOCUMENTS 9,749,470 B1 * 8/2017 Lockenour ............... H04W 4/48
10,708,751 B2 * 7/2020 Patil ..................... H04W 72/082
(Continued)

FOREIGN PATENT DOCUMENTS

JP    2004-251762 A    9/2004
JP    2007-235530 A    9/2007
(Continued)

OTHER PUBLICATIONS

International Search Report and Written Opinion dated Oct. 2, 2018 for PCT/JP2018/031683 filed on Aug. 28, 2018, 9 pages including English Translation of the International Search Report.

*Primary Examiner* — Gary Lafontant
(74) *Attorney, Agent, or Firm* — Xsensus LLP

(57) ABSTRACT

There is provided a transmission/reception device that suppresses communication in a situation with low necessity. The transmission/reception device 1 includes a first antenna 11 for performing first communication, a control unit, and a recording unit 39 in which related information of a mobile terminal is registered. The transmission/reception device is mounted in a vehicle. The control unit 33 performs a control to suppress the first communication for the mobile terminal when determining that the mobile terminal is located in an interior of the vehicle based on at least one of a communication result of the first communication and a communication result of second communication with the mobile terminal in which the related information is registered in the recording unit 39.

18 Claims, 7 Drawing Sheets

(51) Int. Cl.
    *H04W 16/14*        (2009.01)
    *H04W 4/029*        (2018.01)

(56)            References Cited

U.S. PATENT DOCUMENTS

2016/0225260 A1*  8/2016  Lin .................. G08G 1/096791
2016/0272154 A1*  9/2016  Sanji ........................ G07C 9/00
2018/0054843 A1*  2/2018  Stahlin .................... H04W 4/80
2019/0159218 A1*  5/2019  Seo ........................ H04W 24/08

FOREIGN PATENT DOCUMENTS

JP          2010-226257 A     10/2010
JP          2015-219641 A     12/2015

* cited by examiner

| Device name | 1st identification information (V2X communication) | 2nd identification information (Near-field communication) |
|---|---|---|
| Device 01 | 5362689 | 5C:59:48 |
| Device 02 | 3653946 | 0C:3E:9F |
| Device 03 | 4652286 | 00:88:65 |
| ... | ... | ... |
| Device 11 | 1243152 | 34:A3:95 |
| Device 12 | 2053699 | B4:F0:AB |
| ... | ... | ... | ived the control signal.

TRANSMISSION/RECEPTION DEVICE, MOBILE TERMINAL, AND COMMUNICATION PROGRAM

CROSS-REFERENCE TO RELATED APPLICATIONS

The present application is based on PCT filing PCT/JP2018/031683, filed Aug. 28, 2018, which claims priority to JP 2017-194111, filed Oct. 4, 2017, the entire contents of each are incorporated herein by reference.

TECHNICAL FIELD

The present invention relates to a transmission/reception device, a mobile terminal, and a communication program.

BACKGROUND ART

There have been conventionally proposed devices for performing V2X communication as in Patent Literature 1.

In V2X communication, vehicle-to-vehicle communication, road-to-vehicle communication, and communication between vehicle and mobile terminal are performed to transmit information useful for driving and the like to the vehicle.

CITATION LIST

Patent Literature

Patent Literature 1: JP 2013-258678 A

SUMMARY OF INVENTION

Technical Problem

However, as an increasing number of terminals communicate with the vehicle, the amount of communication may upsurge. Among the terminals, a mobile terminal mounted in a vehicle (automobile, motorcycle, bicycle, or the like) equipped with a V2X transmission/reception device may transmit not information useful for V2X communication but information duplicating information transmitted/received by the V2X transmission/reception device.

Therefore, an object of the present invention is to provide a transmission/reception device, a mobile terminal, and a communication program for suppressing communication under a situation where there is less necessity.

Solution to Problem

The transmission/reception device according to the present invention includes: a first antenna for performing first communication; a control unit; and a recording unit in which related information of a mobile terminal is registered. The transmission/reception device is mounted in a vehicle. The control unit performs a control to suppress the first communication for the mobile terminal when determining that the mobile terminal is located in an interior of the vehicle based on at least one of a communication result of the first communication and a communication result of second communication with the mobile terminal in which the related information is registered in the recording unit.

Preferably, the transmission/reception device further includes a second antenna for performing the second communication. During a first state in which the second communication with the mobile terminal via the second antenna is possible, the control unit performs the control to suppress the first communication for the mobile terminal.

More preferably, as the control to suppress the first communication for the mobile terminal, the control unit stops transmission of own vehicle information only to the mobile terminal via the first antenna.

More preferably, as the control to suppress the first communication for the mobile terminal, the control unit transmits, in the second communication with the mobile terminal via the second antenna, a control signal for stopping transmission/reception of information for the first communication to the mobile terminal. The control signal makes the transmission/reception of information for the first communication to stop, in accordance with a program for communication for the mobile terminal in the mobile terminal having received the control signal.

This makes it possible to suppress transmission of information from the mobile terminal. Therefore, not only the transmission/reception device mounted in the same vehicle interior but also devices not in said vehicle (e.g., devices mounted in another vehicle) can perform communication while excluding information from the unnecessary mobile terminal.

More preferably, the transmission/reception device transmits information obtained by the first communication to an information output device provided in the vehicle. Of the information obtained by the first communication, the control unit stops transmission of information obtained by the first communication with the mobile terminal in the first state to the information output device.

This makes it possible to output the information obtained by communication to the information output device while excluding information from the unnecessary mobile terminal.

More preferably, a plurality of the second antennas is provided in the interior of the vehicle. The determination on whether it is in the first state in which the second communication with the mobile terminal is possible is performed depending on whether two or more of the plurality of second antennas are capable of the second communication with a predetermined or higher radio field intensity.

More preferably, the recording unit has a database indicating, as the related information, relationships among a device name of the mobile terminal, first identification information to be used for the first communication, and second identification information to be used for the second communication. The database is used for the determination on whether it is in the first state and the control for suppressing the first communication for the mobile terminal.

More preferably, the control unit compares that of the mobile terminal obtained via the first antenna with that of the vehicle regarding at least one of position information and speed information, and performs the control to suppress the first communication for the mobile terminal based on a result of the comparison.

More preferably, the first communication is a V2X communication.

This makes it possible to suppress transmission of information related to the V2X communication from the mobile terminal unnecessary for the V2X communication. Accordingly, not only transmission/reception devices mounted in the same vehicle interior but also devices not in said vehicle (e.g., V2X-related devices mounted in another vehicle) can perform V2X communication while excluding information from mobile terminals unnecessary for the V2X communication.

More preferably, the second communication is a near-field communication.

A mobile terminal according to the present invention is a mobile terminal including: a first communication unit for performing first communication; and a terminal control unit. The terminal control unit performs a control to suppress the first communication by the first communication unit when the mobile terminal is located in an interior of a vehicle equipped with a transmission/reception device capable of the first communication.

This makes it possible to suppress transmission of information from the mobile terminal. Therefore, not only the transmission/reception device mounted in the same vehicle interior but also devices not in said vehicle (e.g., devices mounted in another vehicle) can perform communication while excluding information from the unnecessary mobile terminal.

Preferably, the mobile terminal further includes: a terminal recording unit in which related information of the transmission/reception device is registered; and a second communication unit for performing second communication with the transmission/reception device where the related information is registered in the terminal recording unit. The terminal control unit performs the control to suppress the first communication by the first communication unit when determining that the mobile terminal is located in an interior of the vehicle based on at least one of a result of communication by the first communication unit and a result of communication by the second communication unit.

More preferably, the determination on whether the mobile terminal is located in the interior of the vehicle includes a determination on whether the second communication is possible with a predetermined or higher radio field intensity. The predetermined radio field intensity is determined according to the size of the interior of the vehicle.

This makes it possible to adjust the size of the area where it is to be determined whether the second communication is possible according to the size of the interior of the vehicle equipped with the transmission/reception device.

More preferably, the second communication is performed in a state where there is no connection permission notification with the transmission/reception device.

The second communication via the second communication unit is for said mobile terminal to obtain identification information on the second communication by the transmission/reception device, and it is not necessary to perform a connection permission notification between the transmission/reception device and the mobile terminal. Accordingly, the second communication can be easily enabled, as compared with the mode requiring the connection permission notification.

More preferably, the terminal control unit compares that of the mobile terminal with that of the vehicle obtained via the first communication unit regarding at least one of position information and speed information, and determines whether the mobile terminal is located in the interior of the vehicle based on a result of the comparison.

More preferably, the first communication is a V2X communication.

This makes it possible to suppress transmission of information related to the V2X communication from the mobile terminal unnecessary for the V2X communication. Accordingly, not only transmission/reception devices mounted in the same vehicle interior but also devices not in said vehicle (e.g., V2X-related devices mounted in another vehicle) can perform V2X communication while excluding information from mobile terminals unnecessary for the V2X communication.

Preferably, the second communication is a near-field communication.

A communication program according to the present invention is a communication program that is executed on a mobile terminal having a first communication unit for performing first communication and a terminal control unit. The communication program performs a control to suppress the first communication by the first communication unit when the mobile terminal is located in an interior of a vehicle equipped with a transmission/reception device capable of the first communication with the first communication unit.

Advantageous Effects of Invention

As described above, according to the present invention, it is possible to provide a transmission/reception device, a mobile terminal, and a communication program for suppressing communication under a situation where there is less necessity.

DESCRIPTION OF EMBODIMENTS

First Embodiment

Figure 1:
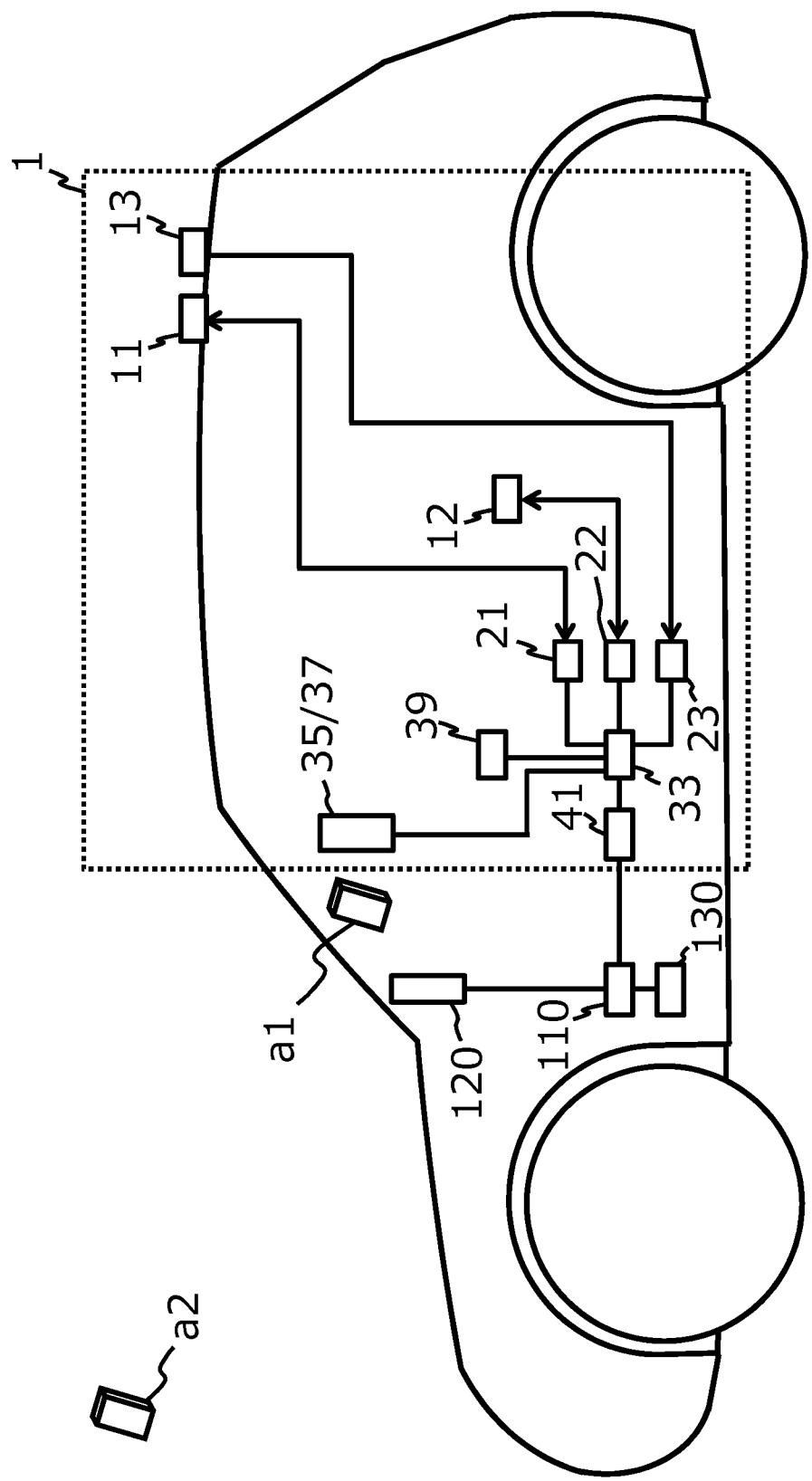
FIG. 1 is a configuration diagram of a vehicle equipped with a transmission/reception device and terminals (a first mobile terminal and a second mobile terminal) near the vehicle in a first embodiment and a second embodiment.

Hereinafter, a first embodiment will be described with reference to the drawings.

Note that the embodiments are not limited to the following embodiments. The description of one embodiment is also applied to other embodiments in principle. Embodiments and modified examples can be appropriately combined.

A transmission/reception device 1 according to the first embodiment includes a first antenna 11, a second antenna 12, a third antenna 13, a first signal processing unit 21, a second signal processing unit 22, a third signal processing unit 23, a control unit 33, an operation unit 35, an output unit 37, and a recording unit 39 (see FIG. 1 to FIG. 5).

As shown in FIG. 1, a vehicle (automobile, motorcycle, bicycle, etc.) to which the transmission/reception device 1 according to the first embodiment is attached includes a gateway Electronic Control Unit (ECU) 110, an information output device 120, and a speed sensor 130.

As an example of a terminal, description will be given as to a state in which a first mobile terminal a1 is inside the vehicle including the transmission/reception device 1 and a second mobile terminal a2 is outside said vehicle.

Figure 2:
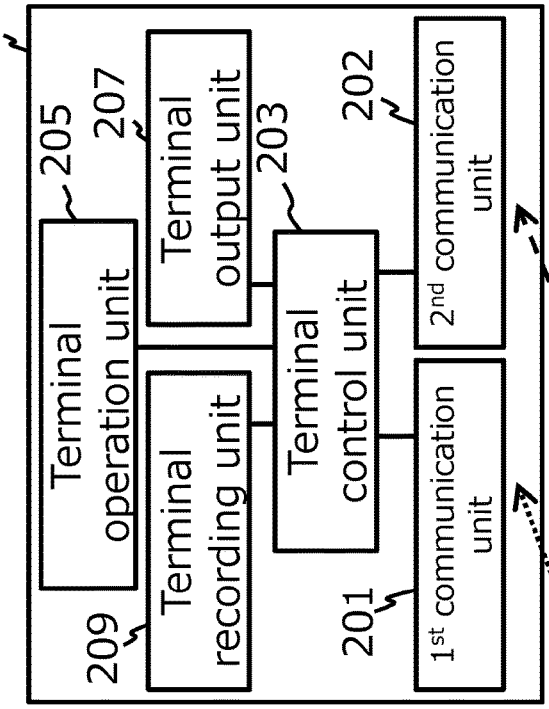
FIG. 2 is a configuration diagram of a transmission/reception device, a first mobile terminal, a second mobile terminal, a gateway ECU, an information output device, and a speed sensor in the first embodiment and the second embodiment.
Figure 2:
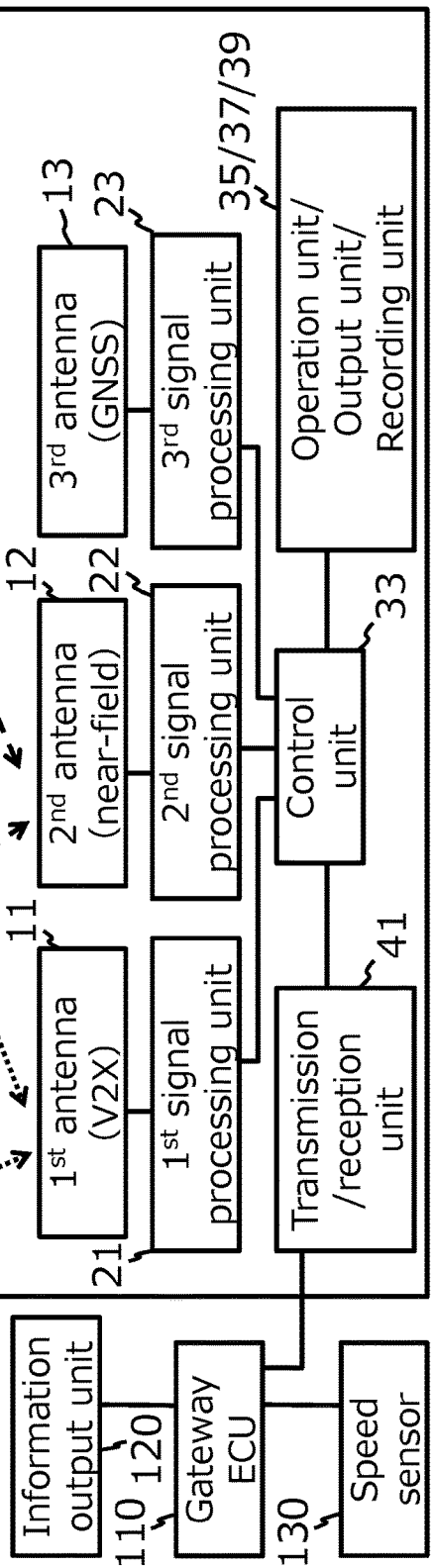

For this reason, as shown in FIG. 2, the first mobile terminal a1 is in a state that is capable of both a V2X communication and a near-field communication with the transmission/reception device 1.

However, the V2X communication is suppressed by a V2X communication suppression control described later.

The second mobile terminal a2 is in a state that is capable of the V2X communication with the transmission/reception device 1 and is incapable of the near-field communication.

The first antenna 11 has an antenna element for performing vehicle-to-vehicle communication, road-to-vehicle communication, and first communication between the vehicle and terminals (V2X communication), based on the IEEE802.11p standard and/or C-V2X (Cellular-V2X) standard. The first antenna 11 is used to transmit/receive information with another vehicle (a vehicle different from the vehicle to which the first antenna 11 is attached), a roadside device, and a terminal.

The first antenna 11 is desirably installed outside the vehicle (e.g., rooftop or the like) to mainly communicate with devices outside the vehicle (another vehicle, a roadside device, a terminal outside the vehicle). However, the first antenna 11 may be installed in the interior of the vehicle.

The second antenna 12 has an antenna element for performing second communication (near-field communication) with a terminal in the interior of the vehicle (e.g., the first mobile terminal a1), based on standards such as IEEE802.15.1 (Bluetooth (registered trademark), IEEE802.11 (wireless LAN), and ISO/IEC18092 (Near Field Communication (NFC)). The second antenna 12 is desirably installed in the interior of the vehicle.

The third antenna 13 has an antenna element for Global Navigation Satellite System (GNSS). The third antenna 13 is used for receiving from a Global Positioning System (GPS) satellite or the like position information and time information of the satellite.

The third antenna 13 is desirably installed outside the vehicle (e.g., rooftop). However, the third antenna 13 may be installed in the interior of the vehicle.

In the first embodiment, the first antenna 11 to the third antenna 13 are housed in separate cases. However, at least two of the first antenna 11 to the third antenna 13 may be housed in one case.

In addition, the first antenna 11 to the third antenna 13 are configured by separate antenna elements. However, at least two of the first antenna 11 to the third antenna 13 may share one antenna element.

The first signal processing unit (V2X module) 21 performs a modulation process and a demodulation process for signal transmission and reception via the first antenna 11, and is involved in V2X communication. The signal transmission and reception via the first antenna 11 includes transmission of own vehicle information and reception of information from the outside of the vehicle.

The own vehicle information is modulated by the first signal processing unit 21 and transmitted via the first antenna 11. The own vehicle information includes position information, speed information, moving direction information, and time information.

Of the own vehicle information, the position information is the position information obtained by the third signal processing unit 23. This position information is subjected to modulation and subsequent D/A conversion in the first signal processing unit 21.

Of the own vehicle information, the speed information is the information that is output from the speed sensor 130 and transmitted via the gateway ECU 110 and a transmission/reception unit 41. This speed information is subjected to modulation and subsequent D/A conversion in the first signal processing unit 21.

Of the own vehicle information, the moving direction information is the information that is output from a gyro sensor mounted in the information output device 120 or the like, or is calculated based on the latest position information, transmitted via the gateway ECU 110 and the transmission/reception unit 41. The moving direction information is subjected to modulation and subsequent D/A conversion in the first signal processing unit 21.

Of the own vehicle information, the time information is the reception time information obtained by the third signal processing unit 23. This time information is subjected to modulation and subsequent D/A conversion in the first signal processing unit 21.

The information from the outside of the vehicle is received via the first antenna 11, subjected to demodulation and A/D conversion in the first signal processing unit 21, and transmitted to the information output device 120 via the transmission/reception unit 41 and the gateway ECU 110. The information from the outside of the vehicle can be other vehicle information including position information, speed information, and time information, information from a roadside device, and information from a terminal (for example, the second mobile terminal a2).

The own vehicle information includes identification information (first identification information) for V2X communication in a device that transmits the own vehicle information. Said device that transmits the own vehicle information can be, for example, a communication device including the first signal processing unit 21.

The information from the outside of the vehicle includes identification information (first identification information) for V2X communication in a device that transmits said information from the outside of the vehicle.

The first identification information may be identification information for V2X communication given to the transmission/reception device 1 mounted in the vehicle. The first identification information may be identification information for V2X communication given to the vehicle.

The second signal processing unit (wireless communication module) 22 performs near-field communication with surrounding terminals via the second antenna 12.

In the first embodiment and a second embodiment described later, communication performed via the first antenna 11 is defined as V2X communication. In the first embodiment and the second embodiment, communication that is shorter in communication distance than the V2X communication and is performed via the second antenna 12 is defined as near-field communication.

The third signal processing unit (position calculation module) 23 receives orbit information and time information of a satellite via the third antenna 13. The third signal processing unit 23 calculates the position information (latitude/longitude information) of the vehicle and the reception time based on the orbit information and time information of the satellite.

A signal including the orbit information and time information of the satellite is received via the third antenna 13. The signal including the orbit information and time information of the satellite is subjected to A/D conversion and demodulation processing in the third signal processing unit 23, and thereafter, the position information of the vehicle and the reception time are calculated.

The position information of the vehicle and the reception time information calculated by the third signal processing unit 23 are transmitted to the information output device 120 via the transmission/reception unit 41 and the gateway ECU 110.

However, the position information of the vehicle and the reception time information may be calculated by the information output device 120.

The first signal processing unit 21 and the second signal processing unit 22 may not use the information on the position information and the reception time information obtained by the third signal processing unit 23, and may each calculate the position information and the reception time information.

In this case, the first antenna 11 has an antenna element for performing V2X communication and an antenna element for GNSS. The second antenna 12 has an antenna element for performing near-field communication and an antenna element for GNSS.

In the first embodiment, the first processing unit 21 to the third signal processing unit 23 are configured by separate signal processing devices. However, at least two of the first signal processing unit 21 to the third signal processing unit 23 may share one signal processing device.

The control unit 33 controls individual units of the transmission/reception device 1, such as the transmission/reception unit 41.

In particular, in the first embodiment, the control unit 33 controls unit of a terminal that has identification information (second identification information) for near-field communication registered in a first database D1 of the recording unit 39 and that is in the first state, in such a manner as to suppress the V2X communication for the duration of the first state. The first state is defined as a state in which the mobile terminal can perform near-field communication with the transmission/reception device 1 via the second antenna 12.

The second identification information may be identification information for near-field communication given to the transmission/reception device 1 mounted in the vehicle. The second identification information may be identification information for near-field communication given to the vehicle.

The operation unit 35 and the output unit 37 are used to register the second identification information of terminals in the recording unit 39.

Figure 3:
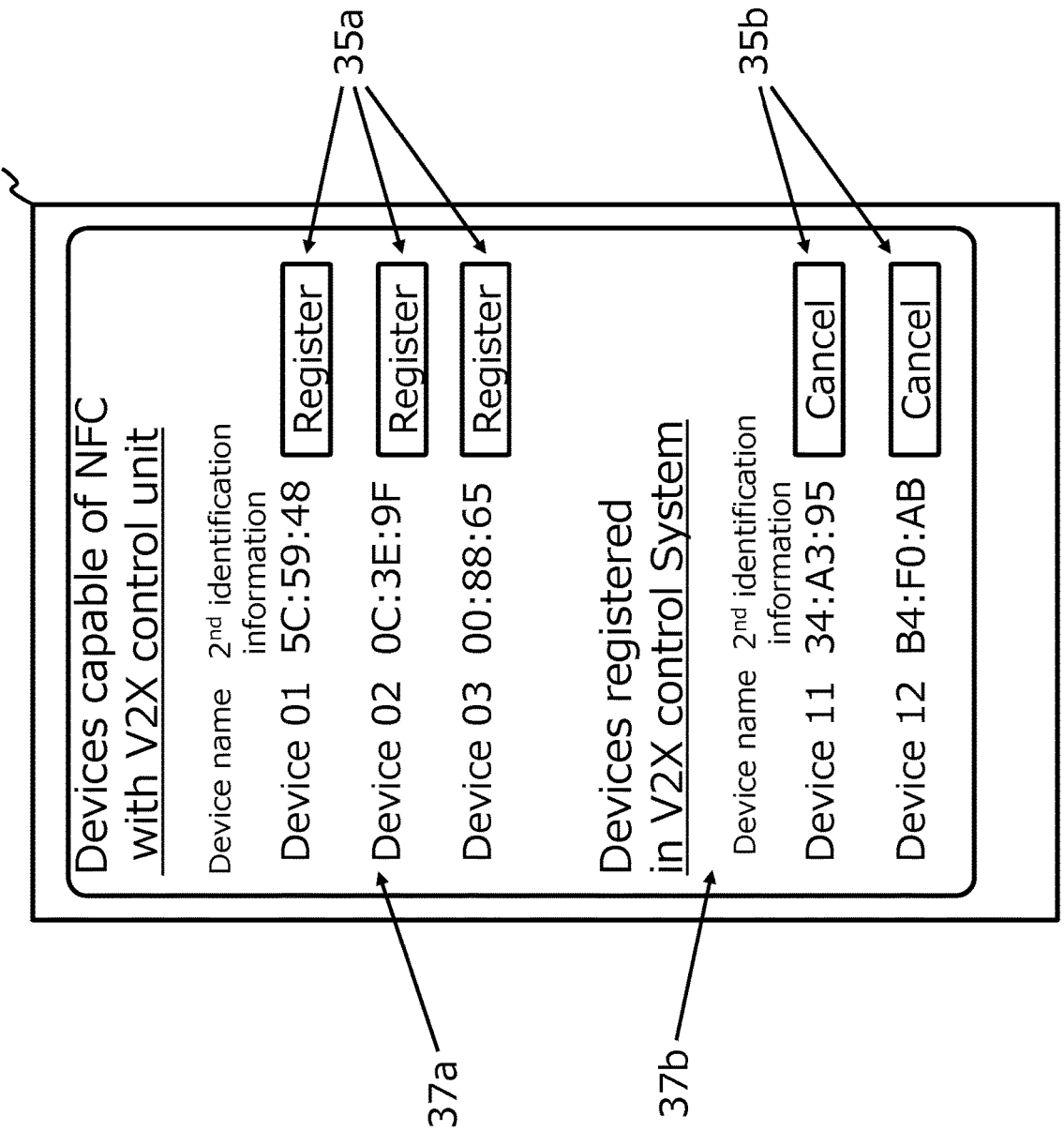
FIG. 3 is a diagram showing an example in which information on mobile terminals capable of near-field communication with the transmission/reception device and others are displayed on an output unit with an operation unit and the output unit in the first embodiment.

Specifically, as shown in FIG. 3, the second identification information of the terminals in a state that are capable of near-field communication via the second antenna 12 is displayed on the output unit 37.

From the displayed second identification information, the second identification information to be registered in the recording unit 39 is selected by a user operation (registration operation) using the operation unit 35.

FIG. 3 shows an example in which the output unit 37 has a first display area 37a and a second display area 37b and is provided with first selection buttons 35a and second selection buttons 35b.

The first display area 37a displays information related to terminals capable of near-field communication via the second antenna 12 at the present time. The information related to terminals capable of near-field communication includes, for example, device names and second identification information.

The second display area 37b displays information related to terminals that have already been registered by a registration operation in the first database D1 of the recording unit 39. The information related to the terminals registered in the first database D1 includes, for example, device names and second identification information.

The first selection button 35a is a button for selecting a registration operation for each terminal displayed in the first display area 37a.

The second selection button 35b is a button for selecting cancellation of the registered state of each terminal displayed in the second display area 37b.

When the first selection button 35a is operated, the device name and the second identification information of the corresponding terminal are added to the first database D1 recorded in the recording unit 39. When the second selection button 35b is operated, the device name and the second identification information of the corresponding terminal are deleted from the first database D1.

Description will be given as to a mode in which the operation unit 35 is a key input unit, the output unit 37 is a display unit, and the registration operation and others are performed through image display and key input such as touch operation. Alternatively, the operation unit 35 may be a voice input unit and the output unit 37 may be a voice output unit, and the registration operation and others may be performed through voice recognition and voice output.

Similarly, a terminal operation unit 205 described later may be a key input unit or a voice input unit. Similarly, a terminal output unit 207 described later may be a display unit or a voice output unit.

The recording unit 39 records the first database D1 as related information of terminals. The first database D1 includes the device name and second identification information corresponding to one or more terminal in which the registration operation using the operation unit 35 and the output unit 37 is undergone, among the terminals have performed near-field communication via the second antenna 12.

Figure 4:
FIG. 4 is a diagram showing an example of contents of a first database.

However, when a first suppression control or a third suppression control described later is to be performed, the first database D1 includes device name, first identification information, and second identification information as shown in FIG. 4.

The first database D1 is used for determining whether the device is in the first state and for V2X communication suppression control.

Of the identification information of the terminals, the information included in the information to be transmitted in the V2X communication (the first identification information) and the information included in the information to be transmitted in the near-field communication (the second identification information) may be the same or different. The terminals here include the transmission/reception device 1, the first mobile terminal a1, and the second mobile terminal a2.

In the case where the same identification information is used, the first database D1 includes information indicating the relationship between the device name and the identification information (the first identification information=the second identification information) that is included in the information to be transmitted in the V2X communication and the near-field communication corresponding to said device name.

When different identification information is used, the first database D1 includes information indicating the relationships among the device name, the first identification information included in information to be transmitted in the V2X communication corresponding to said device name, and the second identification information included in the information to be transmitted in the near-field communication corresponding to said device name (see FIG. 4).

The device name refers to a name set by the manufacturer such as a product number or a product name set in the terminal (here, the transmission/reception device 1, the first mobile terminal a1, or the second mobile terminal a2), or a name set by the user. The device name is registered in each terminal.

If the information received during the V2X communication includes the device name and the first identification information and the information received during the near-field communication includes the device name and the second identification information, it is possible to generate the first database D1 indicating the relationships among the device name, the first identification information, and the second identification information.

The transmission/reception unit (Ethernet (registered trademark) module) 41 communicates with the gateway ECU 110 via an in-vehicle LAN such as Controller Area Network (CAN).

The transmission/reception unit 41 is connected to the gateway ECU 110 via a LAN cable.

The gateway ECU 110 transmits and receives signals to and from electronic devices installed in the vehicle via the in-vehicle LAN.

The information output device 120 is a device that outputs information as audio and/or video, such as a car navigation system and audio equipment. The information output device 120 outputs the information obtained by the V2X communication transmitted from the transmission/reception device 1.

The description of the first embodiment is based on the assumption that the transmission/reception device 1 and the information output device 120 are separate members. However, the information output device 120 may include some or all of the members of the transmission/reception device 1.

In this case, commonly necessary components such as the operation unit 35 and the output unit 37 can be effectively used. Further, communication between the transmission/reception device 1 and the information output device 120 via the gateway ECU 110 becomes unnecessary.

The speed sensor 130 outputs information on the speed of the vehicle to the gateway ECU 110 using a pulse signal or the like.

However, the connection between the transmission/reception device 1 and each unit of the vehicle is not limited to the connection via the in-vehicle LAN.

As shown in FIG. 2, each of the first mobile terminal a1 and the second mobile terminal a2 includes a first communication unit 201, a second communication unit 202, a terminal control unit 203, the terminal operation unit 205, the terminal output unit 207, and a terminal recording unit 209. The first communication unit 201 is used for performing the V2X communication. The second communication unit 202 is used for performing the near-field communication. The terminal control unit 203 controls each unit in the terminal.

The on/off operation of the first communication unit 201 and the second communication unit 202 is performed by the user operating the terminal operation unit 205.

However, the on/off operation may be automatically performed under certain conditions as in a second embodiment described later (see steps S22, S25, and S26 shown in FIG. 7).

In addition, information on the on/off states of the first communication unit 201 and the second communication unit 202 and others are displayed on the terminal output unit 207.

Each of the first mobile terminal a1 and the second mobile terminal a2 executes a program (V2X communication program) for performing the V2X communication and the near-field communication. The V2X communication program is activated.

The V2X communication program executed on the first mobile terminal a1 and the second mobile terminal a2 may be installed in the terminal recording unit 209 or may be provided on a cloud to run on a browser displayed on the terminal output unit 207.

Next, details of a V2X communication suppression control in the first embodiment will be provided.

Figure 5:
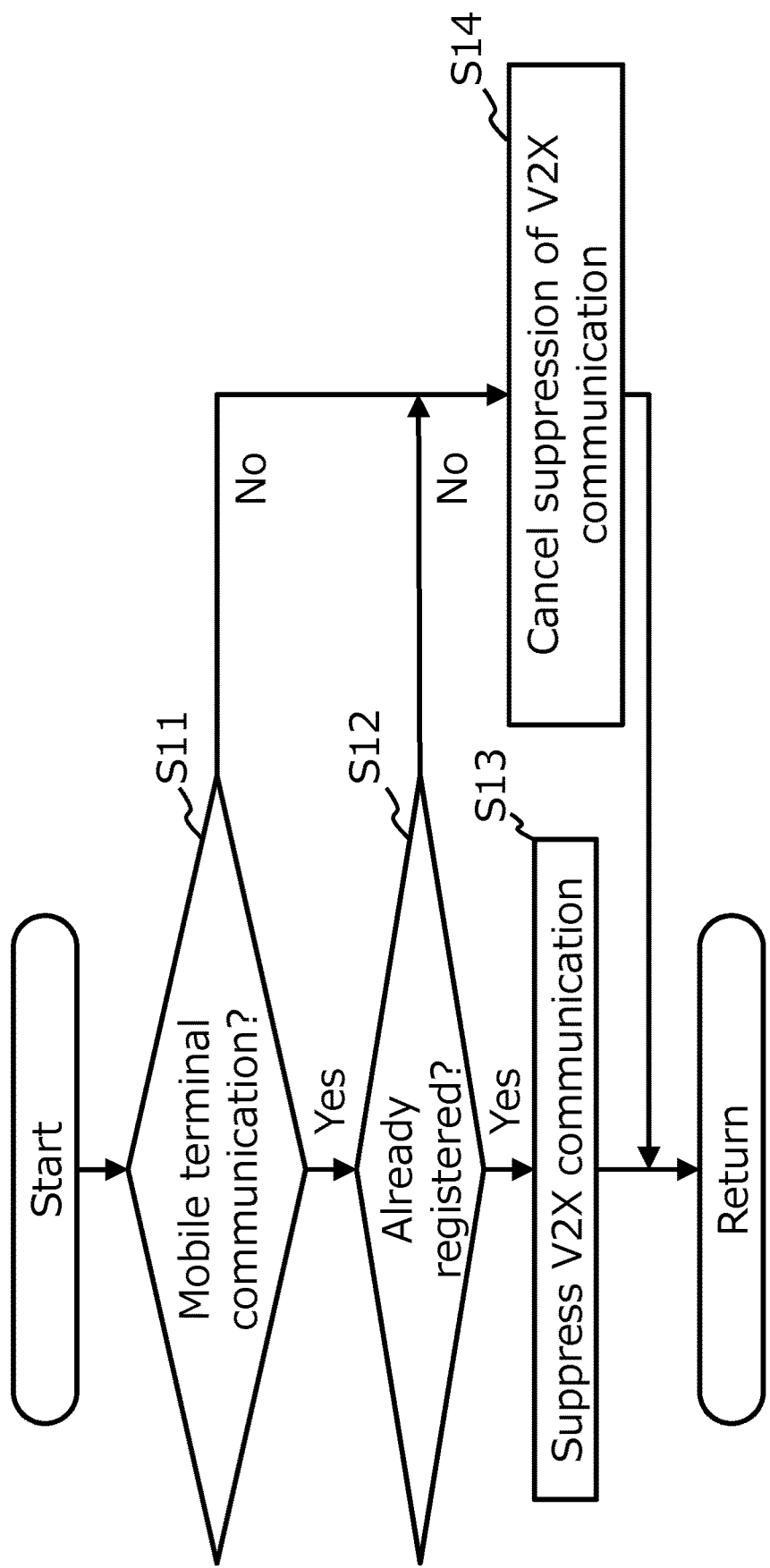
FIG. 5 is a flowchart showing a procedure of a V2X communication suppression control in the first embodiment.

After the vehicle is powered on, the control unit 33 performs the V2X communication suppression control in the procedure shown in FIG. 5 (steps S11 to S14) every first time T1 (for example, T1=10 ms).

In step S11, the control unit 33 determines whether there is a terminal that performs the near-field communication in the interior of the vehicle in which the transmission/reception device 1 is mounted.

Specifically, the control unit 33 determines whether there is a terminal that performs the near-field communication with the transmission/reception device 1 via the second antenna 12. That is, the control unit 33 determines whether there is a terminal that can receive the identification information via the near-field communication.

In addition, when the mobile terminal needs to be always located at a short distance of several centimeters from the second antenna 12 in order to perform the near-field communication such as NFC, the second antenna 12 is desirably provided with a holding member that holds the mobile terminal. Thereby, the mobile terminal and the second antenna 12 can always be kept in the state that is capable of the near-field communication.

Further, instead of providing the holding member, the following determination control may be performed. Specifically, when $1^{st}$ time near-field communication is performed via the second antenna 12, such as bringing the mobile terminal into contact with an area including the second antenna 12, the control unit 33 determines that said mobile terminal is located in the interior of the vehicle. Further, when $2^{nd}$ time near-field communication is performed via the second antenna 12 such as bringing the mobile terminal again into contact with said area, the control unit 33 cancels the determination that the mobile terminal is located in the interior of the vehicle. The $2^{nd}$ time near-field communication is performed when the owner carrying the mobile terminal leaves the vehicle. Even in this case, the V2X communication suppression control can be performed while the mobile terminal is located in the interior of the vehicle.

Further, instead of providing the holding member, the following determination control may be performed. Specifically, there are separately provided a second antenna 12 for determining that the mobile terminal is located in the interior of the vehicle (registration antenna), and a second antenna 12 for cancelling the determination that the mobile terminal is located in the interior of the vehicle (cancellation antenna). When the near-field communication is performed by bringing the mobile terminal into contact with an area including said registration antenna, the control unit 33 determines that the mobile terminal is located in the interior of the vehicle. When the near-field communication is performed by bringing the mobile terminal into contact with an area including said cancellation antenna, the control unit 33 cancel the determination that the mobile terminal is located in the interior of the vehicle. The near-field communication via the cancellation antenna is performed when the owner carrying the mobile terminal leaves the vehicle. Even in this case, the V2X communication suppression control can be performed while the mobile terminal is located in the interior of the vehicle.

If there is a terminal performing the near-field communication, in step S12, the control unit 33 determines whether the second identification information of said terminal is included in the first database D1 recorded in the recording unit 39.

There is a possibility that the information transmitted for V2X communication by the first mobile terminal a1 in the interior of the vehicle (position information, etc.) overlaps the own vehicle information transmitted by the transmission/reception device 1 of the vehicle in which the first mobile terminal a1 is placed. That is, there is a high possibility that the first mobile terminal a1 is not in a state where useful information for V2X communication is transmitted.

In this case, it is unlikely that the transmission/reception device 1 of said vehicle needs information that the first mobile terminal a1 transmits for V2X communication.

In addition, V2X-related devices mounted in another vehicle only need to obtain information transmitted for V2X communication by the transmission/reception device 1 of said vehicle. It is also unlikely that the V2X-related devices mounted in another vehicle needs the information transmitted for V2X communication by the first mobile terminal a1.

If the second identification information of said terminal is included in the first database D1, it is determined that the first mobile terminal a1 is in the interior of the vehicle equipped with the transmission/reception device 1, and that the first mobile terminal a1 is in a state of low necessity for V2X communication. Thus, the process proceeds to step S13. In step S13, the control unit 33 performs a control to suppress the V2X communication for the terminal (the first mobile terminal a1) in a state that is capable of near-field communication.

Specifically, as one of the controls for suppressing the V2X communication, the control unit 33 performs a first suppression control. That is, during the first state, the control unit 33 stops transmitting the own vehicle information only to the first mobile terminal a1 via the first antenna 11.

The control unit 33 also stops the transmission of the own vehicle information when determining based on the first database D1 that the first identification information of the destination of the own vehicle information is only one corresponding to the first mobile terminal a1.

However, the transmission of the own vehicle information to an unspecified destination is not suppressed but is performed as usual.

This makes it possible to suppress the transmission of information related to V2X communication to the terminal having a low necessity for V2X communication (the first mobile terminal a1). Specifically, it is possible to transmit the information related to V2X communication via the first antenna 11 while excluding the information to the terminal having a low necessity for V2X communication (the first mobile terminal a1). Reducing the amount of transmission related to V2X communication from the transmission/reception device 1 allows more efficient use of wireless resources. Therefore, it is possible to realize low power consumption of the first mobile terminal a1 and the transmission/reception device 1.

Further, as one of the controls for suppressing the V2X communication, the control unit 33 performs a second suppression control. That is, the control unit 33 transmits a control signal for stopping the transmission of information related to V2X communication to the first mobile terminal a1 in the near-field communication with the first mobile terminal a1 via the second antenna 12.

Upon receiving said control signal, the first mobile terminal a1 stops transmitting information related to V2X communication using the V2X communication program during the first state.

When the state in which the near-field communication with the transmission/reception device 1 is possible (the first state) is cancelled via the second communication unit 202, the first mobile terminal a1 resumes transmitting information related to V2X communication.

In this case, it is possible to suppress the transmission of information related to V2X communication from the terminal having a low necessity for V2X communication (the first mobile terminal a1). For this reason, not only the transmission/reception device 1 mounted in the same vehicle interior but also devices not in said vehicle can perform V2X communication while excluding information from a terminal unnecessary for V2X communication (the first mobile terminal a1). The devices not in said vehicle may be, for example, V2X-related devices mounted in other vehicles. It is also possible to reduce the amount of transmission related to V2X communication from the first mobile terminal a1 and allow more efficient use of wireless resources. Therefore, it is possible to realize low power consumption of the first mobile terminal a1 and the transmission/reception device 1.

Further, as one of the controls for suppressing the V2X communication, the control unit 33 performs the third suppression control. That is, the control unit 33 stops transmission of information that has been transmitted from the first mobile terminal a1 and received via the first antenna 11, to another device during the first state. The "information received via the first antenna 11" here may be, for example, position information of the first mobile terminal a1. The "another device" here may be, for example, the information output device 120.

Specifically, when the control unit 33 determines based on the first database D1 that the information received via the first antenna 11 is from the first mobile terminal a1, the first signal processing unit 21 or the control unit 33 does not transmit said information to the outside via the transmission/reception unit 41. That is, when the control unit 33 determines that the sender information of the information received via the first antenna 11 (information obtained by V2X communication) includes the first identification information of the first mobile terminal a1, the first signal processing unit 21 or the control unit 33 does not transmit said information to the outside via the transmission/reception unit 41.

This makes it possible to suppress the transmission of information related to V2X communication from the terminal having a low necessity for V2X communication (the first mobile terminal a1) to an external device. Specifically, it is possible to output the information obtained by the V2X communication to the information output device 120 or the like while excluding the information from the terminal having a low necessity for the V2X communication (the first mobile terminal a1).

The control unit 33 may be configured to transmit the information obtained by V2X communication (other vehicle information or the like) to the first mobile terminal a1 via the near-field communication. In this case, the terminal control unit 203 of the first mobile terminal a1 causes the terminal output unit 207 to output the information obtained by said V2X communication.

The information to be output to the terminal output unit 207 may be selected among the information obtained through the V2X communication by the user operating the terminal operation unit 205.

The control unit 33 or the terminal control unit 203 may determine whether the information obtained by the V2X communication is highly urgent, such as information on nearby vehicles or persons. Then, when the information is highly urgent, the terminal control unit 203 causes the terminal output unit 207 to output the information obtained by the V2X communication.

A mode that the determination on whether the information is highly urgent is performed by reading a predetermined parameter included in the information obtained by the V2X communication, is considered. However, the determination on whether the information is highly urgent may be made by the control unit 33 or the terminal control unit 203 reading the contents of the information obtained through the V2X communication.

If there is no terminal that performs the near-field communication, or if there is a terminal that performs the near-field communication but the second identification information of said terminal is not included in the first database D1, the process proceeds to step S14. In step S14, the control unit 33 cancels the control for suppressing the V2X communication.

Second Embodiment

In the second suppression control according to the first embodiment described above, a mode in which the transmission of the information related to V2X communication by the first mobile terminal a1 is suppressed, when the first mobile terminal a1 receives the control signal for stopping the transmission of the information related to V2X communication as a trigger, is described. Alternatively, regardless of the control signal, while the first mobile terminal a1 is in a state that is capable of near-field communication with the transmission/reception device 1 via the second communication unit 202 and the second antenna 12, the transmission of the information related to V2X communication may be stopped (a second embodiment, see FIGS. 1, 2, 6, and 7).

The terminal operation unit 205 and the terminal output unit 207 are used to register the second identification information of the terminal (the transmission/reception device 1) in the terminal recording unit 209.

Figure 6:
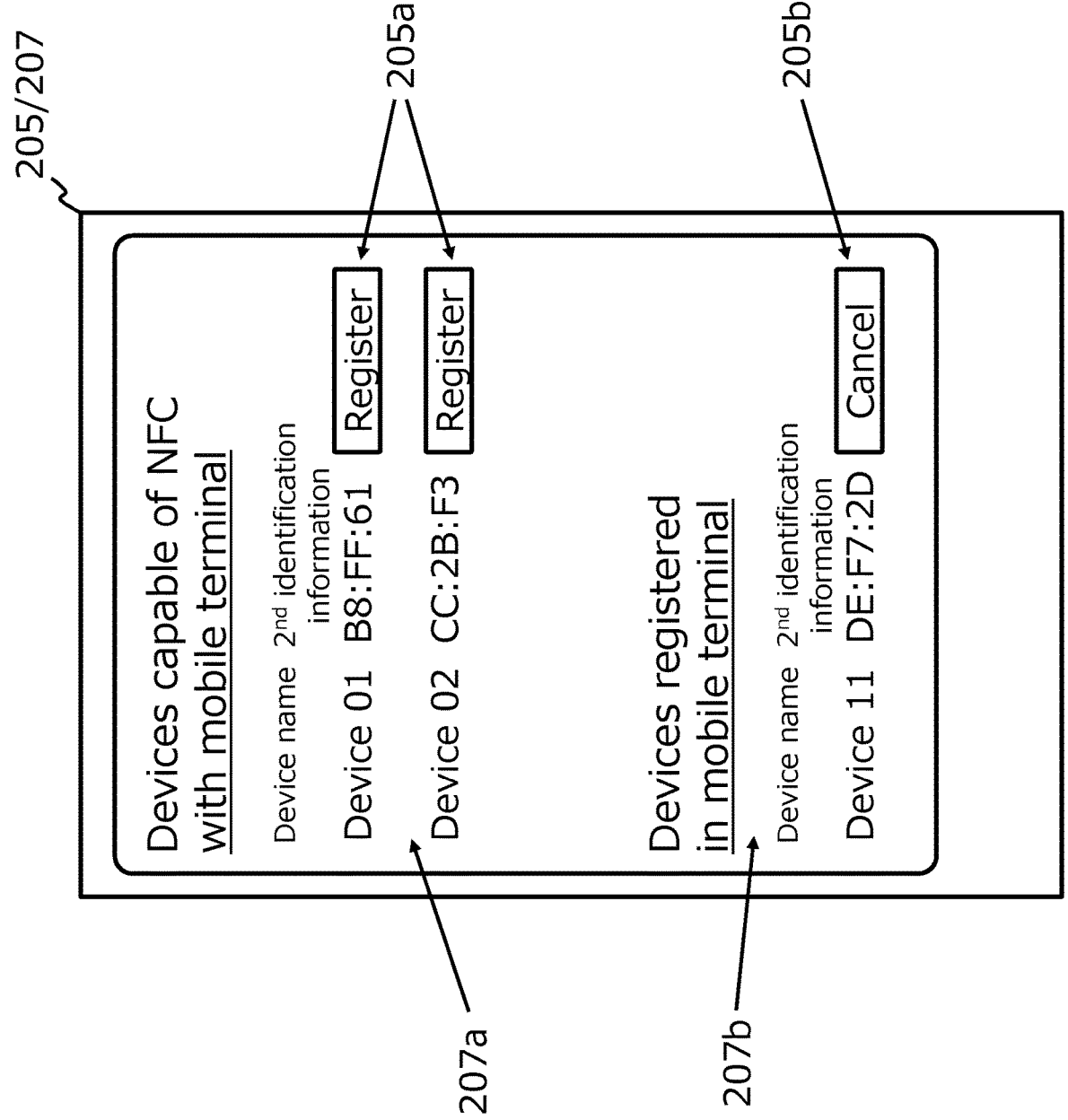
FIG. 6 is a diagram showing an example in which information on transmission/reception devices capable of near-field communication with the mobile terminal and others are displayed on a terminal output unit with a terminal operation unit and the terminal output unit in the second embodiment.

Specifically, as shown in FIG. 6, via the second communication unit 202, the second identification information of the terminals in a state that are capable of near-field communication is displayed on the terminal output unit 207.

From the displayed second identification information, the second identification information to be registered in the terminal recording unit 209 is selected by a user operation (registration operation) using the terminal operation unit 205.

FIG. 6 shows an example in which the terminal output unit 207 has a third display area 207a and a fourth display area 207b and is provided with third selection buttons 205a and a fourth selection button 205b.

The third display area 207a displays information related to terminals capable of near-field communication via the second communication unit 202 at the present time. The information related to terminals capable of near-field communication includes, for example, device names and second identification information.

The fourth display area 207b displays information related to terminals that have already been registered by a registration operation in the terminal recording unit 209. The information related to the terminals registered in the terminal recording unit 209 includes, for example, device names and second identification information.

The third selection button 205a is a button for selecting a registration operation for each terminal displayed in the third display area 207a.

The fourth selection button 205b is a button for selecting cancellation of the registration state of each terminal displayed in the fourth display area 207b.

When the third selection button 205a is operated, the second identification information of the corresponding terminal (the transmission/reception device 1) is added to a second database D2 recorded in the terminal recording unit 209. When the fourth selection button 205b is operated, the second identification information of the corresponding terminal (the transmission/reception device 1) is deleted from the second database D2.

The terminal recording unit 209 records the second database D2 as related information of the transmission/reception device 1. The second database D2 includes the device name and second identification information corresponding to one or more terminal in which the registration operation using the terminal operation unit 205 and the terminal output unit 207 is undergone, among the terminals have performed near-field communication via the second communication unit 202.

The second database D2 is used for determining whether the device is in a second state.

The terminal in a state that is capable of near-field communication to the terminal corresponding to the second identification information registered in the second database D2 of the terminal recording unit 209, via the second communication unit 202, stops the transmission of the information for V2X communication. For example, the first mobile terminal a1 in a state that is capable of near-field communication (the second state) with the transmission/reception device 1 via the second communication unit 202 stops transmitting the information for V2X communication.

That is, in the second embodiment, when the transmission/reception device 1 that has the second identification information registered in the second database D2 of the terminal recording unit 209 as related information is in the second state, the terminal control unit 203 controls each unit to stop the transmission of the information for V2X communication during the second state. The second state is defined as a state in which the transmission/reception device 1 can perform near-field communication with the mobile terminal via the second communication unit 202.

Next, details of a V2X transmission on/off control in the second embodiment will be provided.

Figure 7:
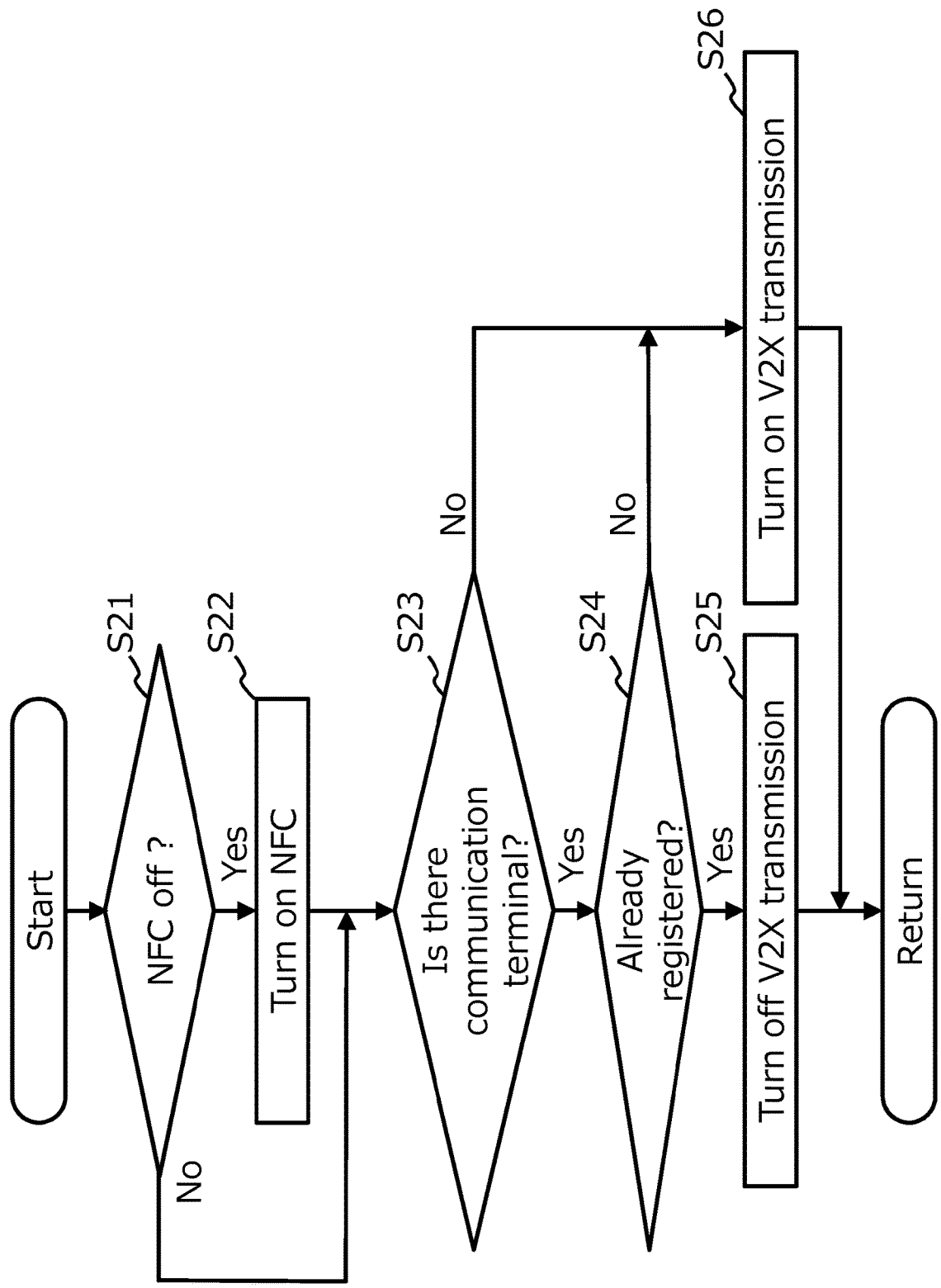
FIG. 7 is a flowchart showing a procedure of a V2X transmission on/off control in the second embodiment.

After the vehicle is powered on, the terminal control unit 203 of the first mobile terminal a1 performs the V2X transmission on/off control in the procedure shown in FIG. 7 (steps S21 to S26) at every first time T1 while the V2X communication program is activated.

In step S21, the terminal control unit 203 of the first mobile terminal a1 determines whether the communication device for near-field communication (the second communication unit 202) is off.

If the second communication unit 202 is off, in step S22, the terminal control unit 203 of the first mobile terminal a1 turns on the second communication unit 202.

If the second communication unit 202 is on, the process proceeds to step S23.

In step S23, the terminal control unit 203 of the first mobile terminal a1 determines whether the first mobile terminal a1 is located in the interior of the vehicle equipped with the transmission/reception device 1.

Specifically, the terminal control unit 203 of the first mobile terminal a1 determines whether there is a terminal that performs near-field communication with the first mobile terminal a1 via the second communication unit 202. That is, the terminal control unit 203 of the first mobile terminal a1 determines whether there is the transmission/reception device 1 that can receive the identification information through the near-field communication.

If there is a terminal that performs near-field communication, in step S24, the terminal control unit 203 of the first mobile terminal a1 determines whether the second identification information of said terminal is included in the second database D2 recorded in the terminal recording unit 209.

If the second identification information of said terminal is included in the second database D2, it is determined that the first mobile terminal a1 is in the interior of the vehicle equipped with the transmission/reception device 1, and that the first mobile terminal a1 has a low necessity for V2X communication. Thus, the process proceeds to step S25. In step S25, the terminal control unit 203 of the first mobile terminal a1 turns off the communication device (the first communication unit 201) related to V2X communication. Alternatively, in step S25, the terminal control unit 203 of the first mobile terminal a1 stops the first communication unit 201 from transmitting the information for V2X communication.

If there is no terminal that performs the near-field communication, or if there is a terminal that performs the near-field communication but the second identification information of said terminal is not included in the second database D2, the process proceeds to step S26. In step S26, the terminal control unit 203 of the first mobile terminal a1 turns on the first communication unit 201, and causes the first communication unit 201 to transmit the information for V2X communication.

However, it is desirable to consider that there is a state in which near-field communication between the first mobile terminal a1 and the transmission/reception device 1 is temporarily interrupted. Specifically, in step S26, the switching of the first communication unit 201 from the off state to the on state, or the switching from the off state to the on state of the information transmission related to V2X communication by the first communication unit 201 takes place only in a predetermined case. It is considered that the predetermined case is attained when a state in which there is no terminal performing near-field communication lasts for a second time T2 (for example, T2=10 s) or more, or when a state in which there is a terminal performing near-field communication but the second identification information of said terminal is not included in the second database D2 lasts for the second time T2 or more.

This makes it possible to suppress the transmission of information related to V2X communication from the terminal having a low necessity for V2X communication (the first mobile terminal a1). For this reason, not only the transmission/reception device 1 mounted in the same vehicle interior but also devices not in said vehicle can perform V2X communication while excluding information from a terminal having a low necessity for V2X communication (the first mobile terminal a1). The devices not in said vehicle may be, for example, V2X-related devices mounted in other vehicles. It is also possible to reduce the amount of transmission related to V2X communication from the first mobile terminal a1 and allow more efficient use of wireless resources. Therefore, it is possible to realize low power consumption of the first mobile terminal a1 and the transmission/reception device 1.

In the second embodiment, the near-field communication via the second antenna 12 and the second communication unit 202 is for the terminal to obtain the second identification information related to the near-field communication of the transmission/reception device 1. Thus, it is not necessary to send a connection permission notification between the transmission/reception device 1 and the terminal. Accordingly, the near-field communication can be easily enabled, as compared with the mode requiring the connection permission notification.

The same applies to the case where only the first suppression control and the third suppression control in the first embodiment is performed and the second suppression control is not performed.

For example, if the vehicle equipped with the transmission/reception device 1 is a bus or the like on which an unspecified number of people get on and the mobile terminal owned by the passenger who got on said vehicle corresponds to the first mobile terminal a1, the user of the transmission/reception device 1 does not match the user of the mobile terminal. Thus, there is a possibility that transmission/reception of a connection permission notification after completion of connection setting such as pairing cannot be performed.

In the second embodiment, however, it is possible to determine whether the state is in the second state in the near-field communication without the connection permission notification. Therefore, even in such a situation, it is possible to control the suppression of transmission of the information related to V2X communication.

Similarly, the terminal control unit 203 of the second mobile terminal a2 performs the V2X transmission on/off control.

In the first embodiment and the second embodiment, the determination on whether the near-field communication is possible between the terminals (the first mobile terminal a1 and the second mobile terminal a2) and the transmission/reception device 1 may include the determination on whether the near-field communication is possible at a predetermined or higher radio field intensity.

The predetermined radio field intensity is desirably determined according to the size of the interior of the vehicle in which the transmission/reception device 1 is mounted.

For example, when the near-field communication is performed in a state where a terminal is installed in the interior of the vehicle, it is set that the radio field intensity of radio waves received by one of this terminal and the transmission/reception device 1 from the other becomes the predetermined radio field intensity. This near-field communication is performed in a state where the terminal (the first mobile terminal a1 or the second mobile terminal a2) is installed in the interior of the vehicle at a position farthest from the second antenna 12.

In this case, outside said vehicle, the near-field communication between the terminal (the first mobile terminal a1 or the second mobile terminal a2) and the transmission/reception device 1 can be performed only at a radio field intensity lower than said predetermined radio field intensity. Therefore, if the near-field communication with the transmission/reception device 1 is not possible, it can be determined that said terminal is not in the interior of the vehicle.

This makes it possible to adjust the size of the area for determining whether the near-field communication is possible according to the size of the interior of the vehicle equipped with the transmission/reception device 1 and the installation position of the second antenna 12.

In addition, only one second antenna 12 may not be necessarily installed but a plurality of second antennas 12 may be installed.

In this case, when two or more of the plurality of second antennas 12 are in a state that is capable of near-field communication at the predetermined or higher radio field intensity, it is determined that the near-field communication with the terminal is possible.

For example, a mode that the second antennas 12 are arranged at the four corners in the interior of the vehicle, is considered.

In the mode described above, all the transmission of information related to V2X communication from the mobile terminal is stopped during the first state or the second state. However, only transmission of specific information among the information related to V2X communication may be stopped.

Further, as shown in step S11 of FIG. 5 and step S23 of FIG. 7, based on the communication result of the near-field communication, it is determined that the terminal which could have performed the near-field communication with the transmission/reception device 1 is located in the interior of the vehicle. That is, it is determined that the terminal which could have received the identification information transmitted by the transmission/reception device 1 via the near-field communication is located in the interior of the vehicle. However, it may be determined whether the terminal is located in the interior of the vehicle based on the communication result of the V2X communication.

Specifically, the terminal control unit 203 of the mobile terminal compares the information transmitted by said mobile terminal in the V2X communication (position information, speed information, and moving direction) with the own vehicle information received from the transmission/reception device 1 via the V2X communication (position information, speed information, and moving direction). The terminal control unit 203 of the mobile terminal determines whether each difference is equal to or less than a threshold. While any difference is equal to or less than the threshold, the terminal control unit 203 of the mobile terminal determines that said mobile terminal is located in the interior of the vehicle, and stops transmitting the information for V2X communication from said mobile terminal.

Said comparison and the determination based on said comparison may be performed by the control unit 33 in the transmission/reception device 1. In this case, when it is determined that said mobile terminal is located in the interior of the vehicle, the control for suppressing the V2X communication in the first embodiment is performed.

Further, said determination may be made based on all the comparison results of the position information, the speed information, and the moving direction, or may be made based on the comparison results of at least one of the position information and the speed information.

When it is determined whether the mobile terminal is located in the interior of the vehicle equipped with the transmission/reception device 1, based on at least the communication result of the near-field communication, the reception of the information for V2X communication in the mobile terminal may also be stopped. Specifically, while it is determined that said mobile terminal is located in the interior of the vehicle (during the first state or the second state), not only the transmission of the information for V2X communication in the mobile terminal but also the reception of the information for V2X communication in the mobile terminal are stopped.

On the other hand, when it is determined whether the mobile terminal is located in the interior of the vehicle equipped with the transmission/reception device 1 based on only the communication result of the V2X communication, the reception of the information for V2X communication in the mobile terminal is desirably continued. Specifically, in order to determine whether to cancel the stopped state of transmission of the information for V2X communication in the mobile terminal, while it is determined that said mobile terminal is located in the interior of the vehicle, the transmission of the information for V2X communication in the mobile terminal is stopped, and the reception of the information for V2X communication in the mobile terminal is continued.

Third Embodiment

In the first embodiment and the second embodiment described above, the first communication unit 201 is used for performing the V2X communication.

However, the first communication unit 201 may be used for performing communication other than V2X communication instead of or in addition to V2X communication (third embodiment).

In the third embodiment, a suppression control of communication other than V2X communication is performed instead of or in addition to the suppression control of V2X communication for a mobile terminal.

Examples of communication other than V2X communication include mobile communication using a telephone line such as calling based on communication standards such as Long Term Evolution (LTE), and communication based on standards such as IEEE 802.15.1 (Bluetooth (registered trademark)), and IEEE 802.11 (wireless LAN). However, other communication may be used.

When the first communication unit 201 is used to perform V2X communication and is used to perform communication other than V2X communication, the first communication unit 201 may include a V2X communication module and a communication module other than the V2X communication as separate members or as an integrated member.

Further, when the first communication unit 201 is not used for performing V2X communication but is used for performing communication other than V2X communication, the first antenna 11 and the first signal processing unit 21 in the transmission/reception device 1 may not be used for performing V2X communication but may be used for performing communication other than V2X communication.

That is, in relation to the first embodiment and the second embodiment, the control for suppressing the V2X communication for the mobile terminal has been described. In this case, the "first communication" performed via the first antenna 11 and the first communication unit 201 corresponds to "V2X communication".

However, the first embodiment and the second embodiment described above are also applicable to a control for suppressing communication other than V2X communication for a mobile terminal. In this case, the first communication performed via the first antenna 11 and the first communication unit 201 corresponds to "communication other than V2X communication" or "communication other than V2X communication and V2X communication". When the "first communication" corresponds to "communication other than V2X communication", a mode that the transmission/reception device 1 performs V2X communication and the mobile terminal may not perform V2X communication, and a mode that the transmission/reception device 1 and the mobile terminal do not perform V2X communication are considered.

As a first application example, a control that the transmission/reception device 1 may suppresses communication other than the V2X communication by the first communication unit 201, is considered. The communication other than the V2X communication by the first communication unit 201 includes at least one of communication between the mobile terminal and the base station, communication between the mobile terminal and a mobile terminal outside the vehicle interior, and communication between the mobile terminal and another mobile terminal inside the vehicle interior.

Specifically, when the mobile terminal is located in the interior of the vehicle, that is, during the first state, the transmission/reception device 1 performs the control to suppress communication other than V2X communication by the first communication unit 201 regarding the mobile terminal. For example, the transmission/reception device 1 transmits a control signal to the mobile terminal as the control for suppressing communication other than V2X communication regarding the mobile terminal. After receiving said control signal, the mobile terminal stops communication other than V2X communication by the first communication unit 201. More specifically, the mobile terminal stops transmission and reception of information by the first communication unit 201 to and from the base station. Further, the mobile terminal stops transmission and reception of information by the first communication unit 201 to and from the mobile terminal outside the vehicle interior. Further, the mobile terminal stops transmission and reception of information by the first communication unit 201 to and from another mobile terminal in the interior of the vehicle.

As a second application example, a control that the mobile terminal suppresses communication other than the V2X communication by the first communication unit 201, is considered.

Specifically, when the mobile terminal is located in the interior of the vehicle, that is, during the second state, the mobile terminal stops transmission of information for communication other than V2X communication by the first communication unit 201 of the mobile terminal. For example, the mobile terminal stops transmission and reception of information by the first communication unit 201 to and from the base station. Further, the mobile terminal stops transmission and reception of information by the first communication unit 201 to and from the mobile terminal outside the vehicle interior. Further, the mobile terminal stops transmission and reception of information by the first communication unit 201 to and from another mobile terminal in the interior of the vehicle.

This makes it possible to suppress transmission or the like of information from the mobile terminal. Therefore, not only the transmission/reception device 1 mounted in the same vehicle interior but also devices not in the vehicle (e.g., devices mounted in another vehicle) can perform communication while excluding information from the mobile terminal from which the transmission of the information is suppressed.

As in the first application example and the second application example, when transmission and reception of information for communication other than V2X communication by the first communication unit 201 in the mobile terminal is stopped, tethering may be performed using the transmission/reception device 1.

Specifically, when transmission and reception of the information for communication other than V2X communication by the first communication unit 201 is stopped, the mobile terminal performs near-field communication with the transmission/reception device 1 by the second communication unit 202. The mobile terminal communicates with various devices outside the vehicle interior via the near-field communication between the mobile terminal and the transmission/reception device 1 by the second communication unit 202 and communication between the transmission/reception device 1 and various devices outside the vehicle interior. This makes it possible to improve convenience for the user of the mobile terminal in the vehicle interior.

Therefore, the transmission/reception device 1 may be a transmission/reception device for performing V2X communication as in the first embodiment and the second embodiment, or may be a transmission/reception device for performing communication other than V2X communication without performing V2X communication.

In the first to third embodiments, a mode that the second communication is near-field communication is described. However, the second communication may be another communication different from near-field communication.

Although several embodiments of the present invention have been described, these embodiments are presented as examples and are not intended to limit the scope of the invention. These embodiments can be implemented in other various forms, and can be omitted, replaced, and changed in various manners without departing from the gist of the invention. These embodiments and modifications thereof are included in the scope and gist of the invention, and are also included in the invention described in the claims and equivalents thereof.

REFERENCE SIGNS LIST

1 Transmission/reception device
11 First antenna
12 Second antenna
13 Third antenna
21 First signal processing unit
22 Second signal processing unit
23 Third signal processing unit
33 Control unit
25 Operation unit
35a First selection button
35b Second selection button
37 Output unit
37a First display area
37b Second display area
39 Recording unit
41 Transmission/reception unit
110 Gateway ECU
120 Information output device
130 Speed sensor 201 First communication unit
202 Second communication unit
203 Terminal control unit
205 Terminal operation unit
205a Third selection button
205b Fourth selection button
207 Terminal output unit
207a Third display area
207b Fourth display area
209 Terminal recording unit
a1 First mobile terminal
a2 Second mobile terminal
D1 First database
D2 Second database

The invention claimed is:

1. A transmission/reception device mounted in a vehicle, comprising
a first antenna for performing first communication;
a control unit; and
a recording unit in which related information of a mobile terminal is registered, wherein
the control unit performs a control to suppress the first communication for the mobile terminal when determining that the mobile terminal is located in an interior of the vehicle based on at least one of a communication result of the first communication and a communication result of second communication with the mobile terminal in which the related information is registered in the recording unit.

2. The transmission/reception device according to claim 1, further comprising a second antenna for performing the second communication, wherein
during a first state in which the second communication with the mobile terminal via the second antenna is possible, the control unit performs the control to suppress the first communication for the mobile terminal.

3. The transmission/reception device according to claim 2, wherein, as the control to suppress the first communication for the mobile terminal, the control unit stops transmission of own vehicle information only to the mobile terminal via the first antenna.

4. The transmission/reception device according to claim 2, wherein
as the control to suppress the first communication for the mobile terminal, the control unit transmits, in the second communication with the mobile terminal via the second antenna, a control signal for stopping transmission/reception of information for the first communication to the mobile terminal, and
the control signal makes the transmission/reception of information for the first communication to stop, in accordance with a program for communication for the mobile terminal in the mobile terminal having received the control signal.

5. The transmission/reception device according to claim 2 that transmits information obtained by the first communication to an information output device provided in the vehicle, wherein
of the information obtained by the first communication, the control unit stops transmission of information obtained by the first communication with the mobile terminal in the first state to the information output device.

6. The transmission/reception device according to claim 2, wherein
a plurality of the second antennas is provided in the interior of the vehicle, and
the determination on whether it is in the first state in which the second communication with the mobile terminal is possible is performed depending on whether two or more of the plurality of second antennas are capable of the second communication with a predetermined or higher radio field intensity.

7. The transmission/reception device according to claim 2, wherein
the recording unit has a database indicating, as the related information, relationships among a device name of the mobile terminal, first identification information to be used for the first communication, and second identification information to be used for the second communication, and
the database is used for the determination on whether it is in the first state and the control for suppressing the first communication for the mobile terminal.

8. The transmission/reception device according to claim 1, wherein the control unit compares that of the mobile terminal obtained via the first antenna with that of the vehicle regarding at least one of position information and speed information, and performs the control to suppress the first communication for the mobile terminal based on a result of the comparison.

9. The transmission/reception device according to claim 1, wherein the first communication is V2X communication.

10. The transmission/reception device according to claim 1, wherein the second communication is near-field communication.

11. A mobile terminal comprising:
a first communication unit for performing first communication; and
a terminal control unit, wherein
the terminal control unit performs a control to suppress the first communication by the first communication unit when the mobile terminal is located in an interior of a vehicle equipped with a transmission/reception device capable of the first communication.

12. The mobile terminal according to claim 11, further comprising:
a terminal recording unit in which related information of the transmission/reception device is registered; and
a second communication unit for performing second communication with the transmission/reception device where the related information is registered in the terminal recording unit, wherein
the terminal control unit performs the control to suppress the first communication by the first communication unit when determining that the mobile terminal is located in an interior of the vehicle based on at least one of a result of communication by the first communication unit and a result of communication by the second communication unit.

13. The mobile terminal according to claim 12, wherein
the determination on whether the mobile terminal is located in the interior of the vehicle includes a determination on whether the second communication is possible with a predetermined or higher radio field intensity, and
the predetermined radio field intensity is determined according to the size of the interior of the vehicle.

14. The mobile terminal according to claim 12 or 13, wherein the second communication is performed without a connection permission notification with the transmission/reception device.

15. The mobile terminal according to claim 11, wherein the terminal control unit compares that of the mobile terminal with that of the vehicle obtained via the first communication unit regarding at least one of position information and speed information, and determines whether the mobile terminal is located in the interior of the vehicle based on a result of the comparison.

16. The mobile terminal according to claim 11, wherein the first communication is V2X communication.

17. The mobile terminal according to claim 12, wherein the second communication is near-field communication.

18. A communication program that is executed on a mobile terminal having a first communication unit for performing first communication and a terminal control unit, wherein the communication program performs a control to suppress the first communication by the first communication unit when the mobile terminal is located in an interior of a vehicle equipped with a transmission/reception device capable of the first communication with the first communication unit.

* * * * *